(12) United States Patent
Metzger

(10) Patent No.: US 9,671,272 B1
(45) Date of Patent: *Jun. 6, 2017

(54) DIPSTICK ADAPTER ASSEMBLY

(71) Applicant: Brandon P. Metzger, Glendale, AZ (US)

(72) Inventor: Brandon P. Metzger, Glendale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/015,909

(22) Filed: Feb. 4, 2016

Related U.S. Application Data

(63) Continuation of application No. 14/106,497, filed on Dec. 13, 2013, now Pat. No. 9,285,259.

(60) Provisional application No. 61/737,633, filed on Dec. 14, 2012.

(51) Int. Cl.
*G01F 23/04* (2006.01)

(52) U.S. Cl.
CPC .................................... *G01F 23/04* (2013.01)

(58) Field of Classification Search
CPC ........................................................ G01F 23/04
USPC ....................... 33/730, 726, 731; 292/256.71
See application file for complete search history.

(56) References Cited

U.S. PATENT DOCUMENTS

| | | | | |
|---|---|---|---|---|
| 1,385,270 A | * | 7/1921 | Petersen ................. G01F 23/04 | 73/864.01 |
| 2,289,597 A | * | 7/1942 | Seat ........................... B25B 1/18 | 269/157 |
| 2,917,832 A | * | 12/1959 | Calmenson ............. G01F 23/04 | 33/730 |
| 3,296,703 A | * | 1/1967 | Stade ...................... G01F 23/04 | 33/731 |
| 5,014,445 A | * | 5/1991 | Martell ................... G01F 23/04 | 33/731 |
| 5,531,428 A | * | 7/1996 | Dembicks ................. B25B 1/24 | 269/172 |
| 5,992,037 A | * | 11/1999 | Klotz ...................... G01F 23/04 | 123/196 R |
| 7,287,616 B2 * | | 10/2007 | Lund .................. F16H 57/0447 | 180/219 |
| 7,546,693 B1 * | | 6/2009 | Impellizeri ............. G01F 23/04 | 33/722 |
| 8,322,699 B2 * | | 12/2012 | Prell ....................... B25B 1/103 | 269/246 |
| 9,255,501 B2 * | | 2/2016 | Esposito ............ F01M 11/0408 | |
| 9,285,259 B1 * | | 3/2016 | Metzger .................. G01F 23/04 | |
| 2008/0048460 A1 * | | 2/2008 | Brady ................... E02D 29/124 | 292/256.71 |

* cited by examiner

*Primary Examiner* — Christopher Fulton
(74) *Attorney, Agent, or Firm* — Thomas W. Galvani, P.C.; Thomas W. Galvani

(57) ABSTRACT

A dipstick adapter assembly for use with an oil pan includes a front fixture having an inner face, and a backing plate coupled to the front fixture opposite the inner face. A first fastener is applied through the front fixture and fixed to the backing plate with a bond to prevent rotation of the backing plate with respect to the first fastener. A second fastener is applied to the front fixture for application to the backing plate so as to engage the backing plate and move the backing plate toward and away from the front fixture.

19 Claims, 8 Drawing Sheets

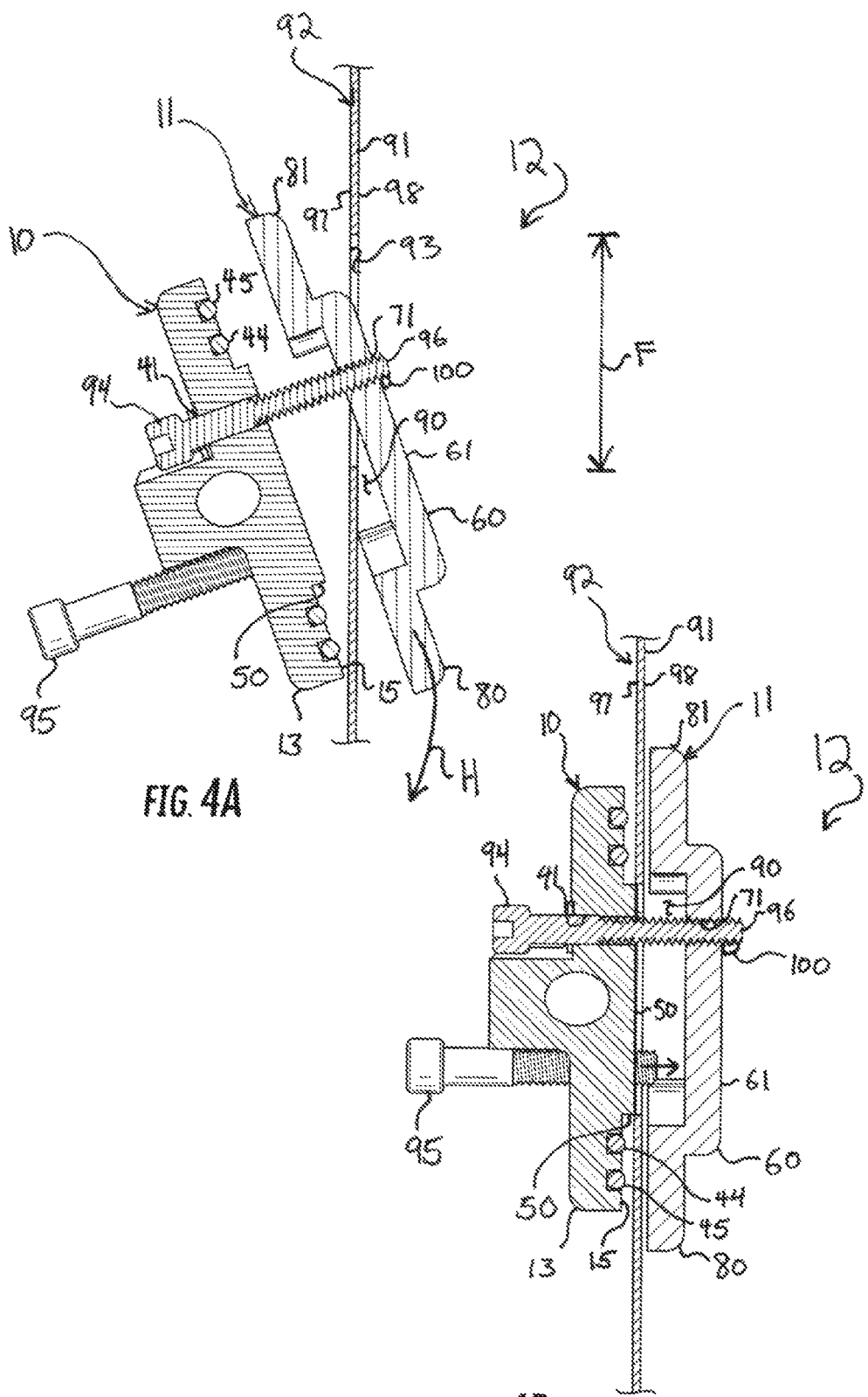

DIPSTICK ADAPTER ASSEMBLY

CROSS-REFERENCE TO RELATED APPLICATIONS

This application is a continuation of prior U.S. patent application Ser. No. 14/106,497, filed Dec. 13, 2013, now U.S. Pat. No. 9,285,259 issued Mar. 15, 2016, which claimed the benefit of U.S. Provisional Application No. 61/737,633, filed Dec. 14, 2012, all of which are hereby incorporated by reference.

FIELD OF THE INVENTION

The present invention relates generally to motor vehicles, and more particularly to oil pans in motor vehicles.

BACKGROUND OF THE INVENTION

Oil pans in motor vehicles are enclosed receptacles which holds and collects oil for a motorized engine. During operation, oil distributed throughout the engine to lubricate moving parts of the engine, and when the engine is off, some of the oil flows into the oil pan, typically located at the bottom of the engine.

Factory oil pans—those which are initially installed on a vehicle at the factory—generally have an adapter for receiving a dipstick. The adapters hold a dipstick in the oil pan so that a user can pull the dipstick and read the oil level. The adapters are fit into a hole in the oil pan, but are poorly designed. A gasket and locknut bind the factory adapter to the oil pan, and when one of the gasket or locknut wears out, part of the adapter can fall into the oil pan. Removing the part requires removing the oil pan, which often also requires removing the engine. This is obviously a very time-consuming and expensive process, especially given the relative expense of replacing the adapter itself. When the oil pan has been removed, the hole can be accessed from both outside of and inside of the oil pan, and can be fitted with a new adapter. Often times, the new adapter has the same shortcomings as the factory adapter; when it wears out, the oil pan must again be removed. An improved dipstick adapter for application to an oil pan is needed.

SUMMARY OF THE INVENTION

A dipstick adapter assembly for replacing a dipstick adapter in an oil pan with a hole includes a front fixture and clamping means. The clamping means is coupled to the front fixture with a first fastener, and the clamping means is moveable through the hole with the first fastener between a free condition and an applied condition, in which the clamping means is inside the oil pan and the front fixture encircles the hole in direct contact against the outer surface of the oil pan and is sealed around the hole. A gasket carried by the front fixture is compressed around the hole. A second fastener is applied to the front fixture for application to the clamping means to move the clamping means inside the oil pan toward the the front fixture to clamp the front fixture and clamping means against each other with the oil pan therebetween. The front fixture is formed with a keyway that receives a key formed in the oil pan proximate to the hole to align the front fixture with respect to the oil pan.

BRIEF DESCRIPTION OF THE DRAWINGS

Referring to the drawings:

FIGS. 4A-4E are section views showing a sequence of steps of applying the dipstick adapter assembly, including the front fixture, backing plate, and two fasteners, to a hole in a wall of an oil pan for holding a dipstick in the oil pan.

DETAILED DESCRIPTION

Figure 1A:
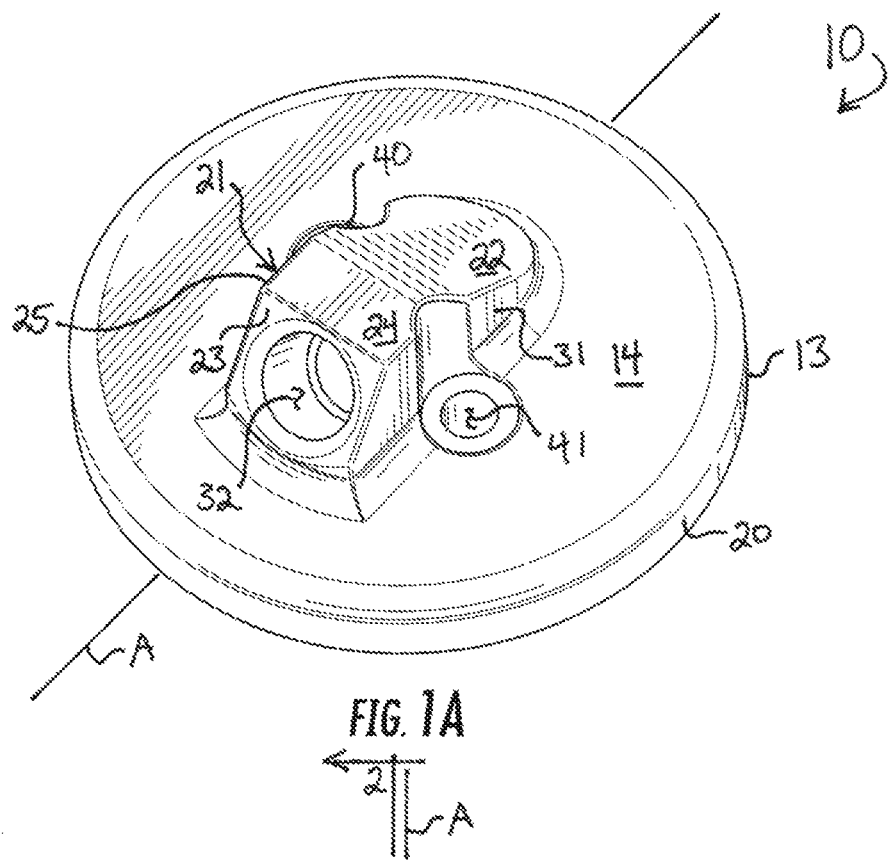
FIGS. 1A and 1B are top perspective and top views, respectively, of a front fixture of a dipstick adapter assembly constructed and arranged in accordance with the principle of the invention.
Figure 3A:
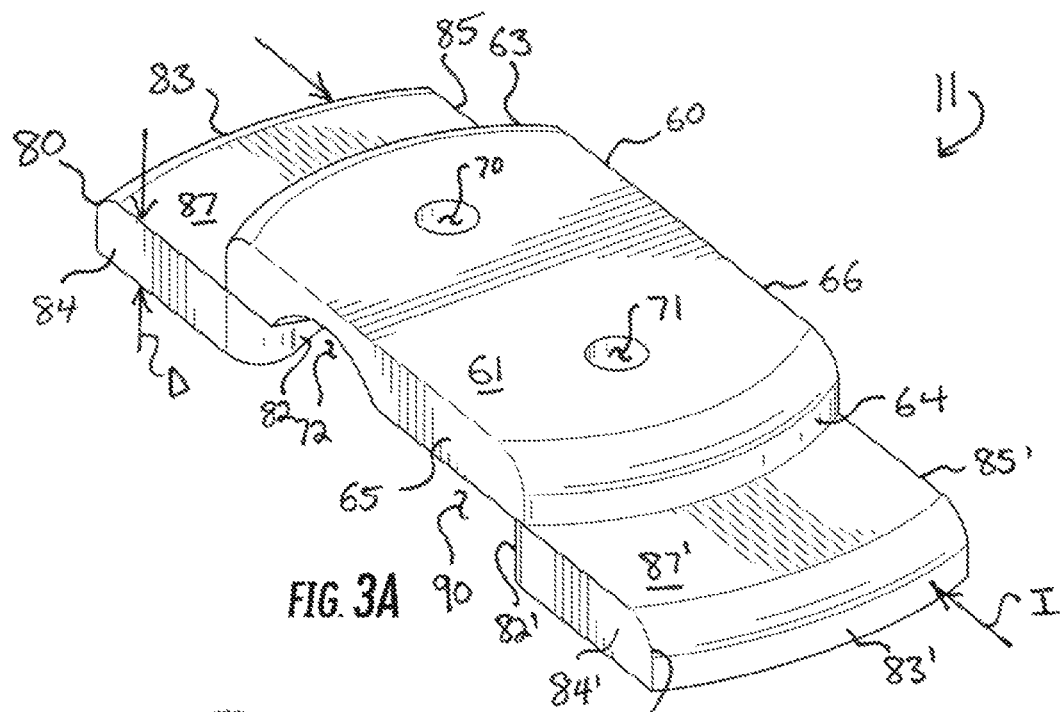
FIGS. 3A-3E are, respectively, top perspective, bottom perspective, side elevation, top, and bottom views of a backing plate for coupling with the front fixture of FIGS. 1A and 1B.

Reference now is made to the drawings, in which the same reference characters are used throughout the different figures to designate the same elements. FIG. 1A and FIG. 3A illustrate a front fixture 10 and a backing plate 11, respectively, of a dipstick adapter assembly 12 shown in FIGS. 4A-4E. The dipstick adapter assembly 12 is useful in vehicle oil pans in which the dipstick holder must be replaced, but for which it is inconvenient to remove the oil pan to do so. The dipstick adapter assembly 12 is installed without removing the oil pan by applying the assembly 12 through a hole in the oil pan and then securing the assembly 12 on the oil pan via fasteners which are adjusted from outside of the oil pan. This saves considerable time and expense.

Figure 1B:
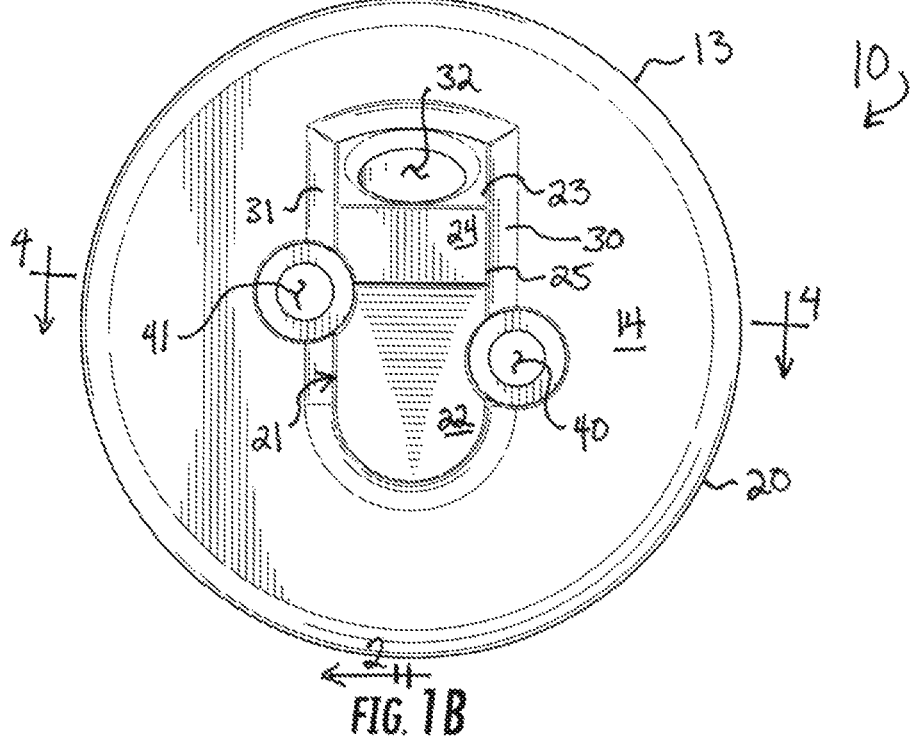

Referring to FIGS. 1A and 1B first, the front fixture 10 has a generally disc-shaped body 13 with an outer face 14, an opposed inner face 15 (shown in FIG. 1C) and a continuous annular sidewall 20 extending between the outer and inner faces 14 and 15. The body 13 is symmetric with respect to an axis A. The outer and inner faces 14 and 15 are flat and parallel with respect to each other. Integrally formed at a center of the outer face 14 is a wedge-shaped projection 21 which projects above the outer face 14. The projection 21 is solid and has a first major face 22 which is oblique with respect to the outer face 14, aligned in a plane at an acute angle to the outer face 14. The projection 21 has an opposed second major face 23 which is oblique with respect to the outer face 14, aligned in a plane which converges with the plane of the first major face 22. The first and second major faces 22 and 23 meet at and are joined along a minor face 24 at a top 25 of the projection 21. The projection 21 also includes two sides 30 and 31 extending from the outer face 14 to the top 25 of the projection 21. The sides 30 and 31 are generally upright, parallel to each other, and perpendicular with respect to the outer face 14.

Figure 2:
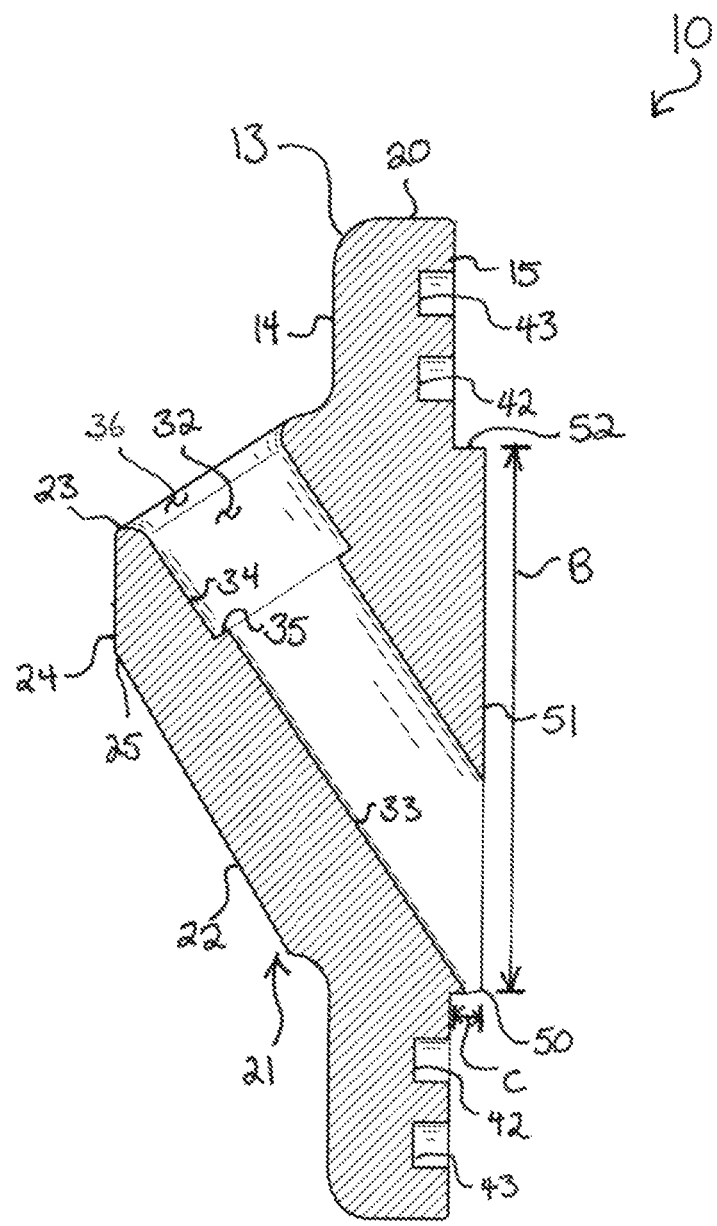
FIG. 2 is a section view of the front fixture of FIGS. 1A and 1B taken along the line 2-2 in FIG. 1B.

As shown in the section view of FIG. 2, the front fixture 10, including the body 13 and the projection 21 formed thereon, is a monolithic piece. The front fixture 10 is constructed from a material or combination of materials having the material characteristics of hardness, durability, rigidity, and non-porosity, such as steel, aluminum, or the like. The front fixture 10 is preferably milled from an aluminum block or billet in a CNC machine. Several holes are formed through the front fixture 10. A dipstick bore 32 extends obliquely through the front fixture 10 from the second major face 23, through the projection 21, through the body 13, and to the inner face 15. The dipstick bore 32 is cylindrical and receives and holds a dipstick applied thereto once the dipstick adapter assembly 12 is applied to an oil pan. The dipstick bore 32 has a cylindrical inner sidewall 33 extending from the inner face 15 which terminates in a cylindrical entrance 34 to the dipstick bore 32 that has a diameter slightly larger than that of the inner sidewall 33. A shoulder 35 defines an edge between the inner sidewall 33 and the entrance 34 of the dipstick bore 32. The entrance 34 terminates in a mouth 36 which is beveled outward in transition to the second major face 23.

Returning to FIGS. 1A and 1B, two bores 40 and 41 extend completely through the body 13 of the front fixture 10 from the outer face 14 through to the inner face 15. The bores 40 and 41 are generally straight and cylindrical, sized and shaped to accommodate bolts adjustably coupling the front fixture 10 to the backing plate 11. The bores 40 and 41 are preferably smooth and not threaded. The bores 40 and 41 are set slightly into the projection 21, so that the sides 30 and 31 are formed with quasi-circular cutouts corresponding to the bores 40 and 41, respectively. The bores 40 and 41 are indirectly opposed from each other across the axis A and are offset from the axis A; the bore 40 is formed proximate to the first major face 22 while the bore 41 is formed proximate to the first major face 22 and the minor face 24.

Figure 1C:
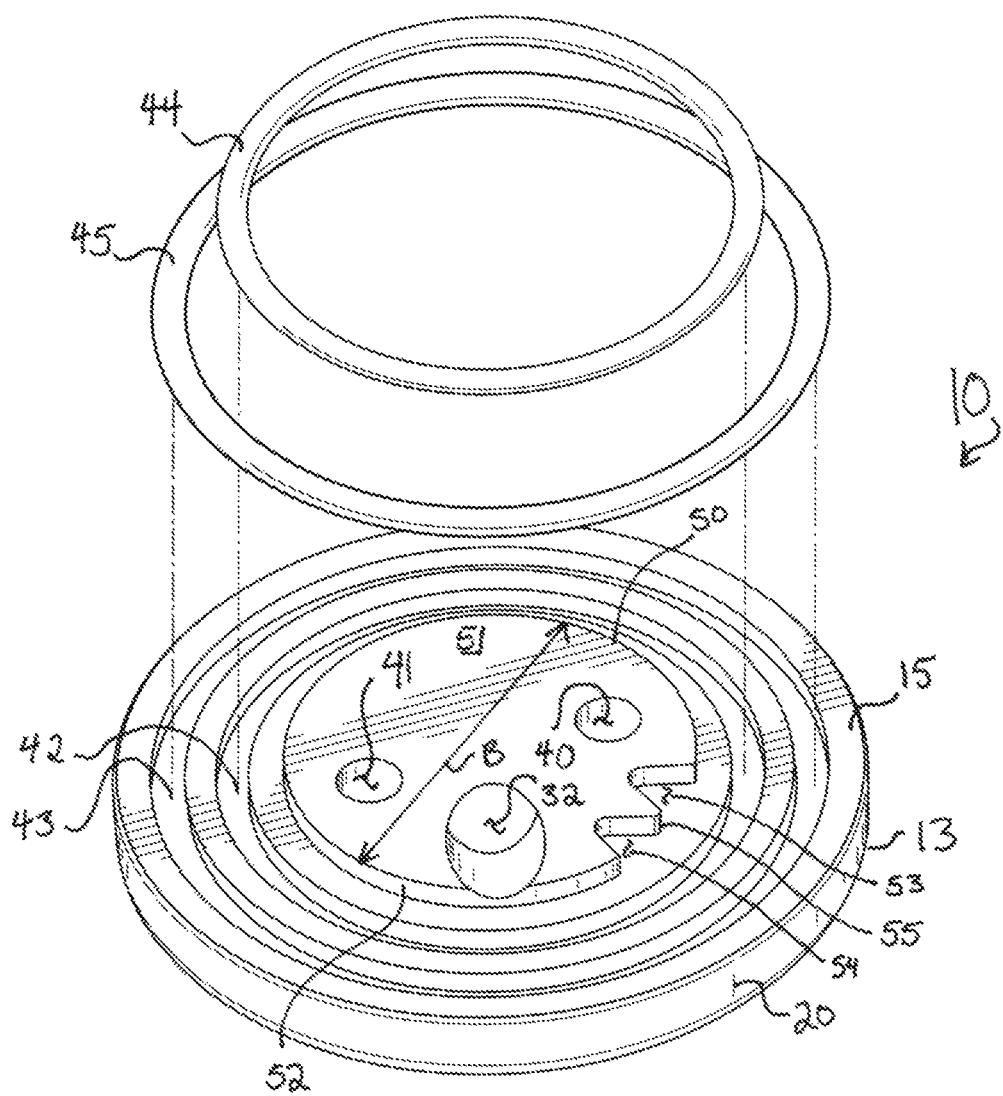
FIG. 1C is an exploded bottom perspective view of the front fixture of FIGS. 1A and 1B.

FIG. 1C is an exploded, rear perspective view of the front fixture 10 illustrating two grooves 42 and 43 formed into the inner face 15 of the front fixture 10. The grooves 42 are annular, spaced-apart, coaxial grooves or channels extending into the body 13 of the front fixture 10. Two gaskets 44 and 45 are seated into the grooves 42 and 43, respectively. The gaskets 44 and 45 are made from a material or combination of materials having the material characteristics of resiliency, elasticity, and compressibility, such as rubber. The gaskets 44 and 45 fill the grooves 42 and 43 and extend just past the inner face 15 of the front fixture 10 so that the gaskets 44 and 45 can be compressed into the grooves 42 and 43 when the front fixture 10 is fitted and clamped against an oil pan.

Still referring to FIG. 1C, the inner face 15 of the front fixture 10 is formed with a protuberance 50. The protuberance 50 is integral to the front fixture 10, is generally cylindrical, and extends away from the inner face 15. The protuberance 50 has a face 51 and an annular sidewall 52 extending from the inner face 15 of the front fixture 10 to the face 51. As shown most clearly in FIG. 2, the protuberance 50 has a diameter B across the face 51 and a height or depth C extending along the sidewall 52.

Two spaced-apart notches 53 and 54 extend into the body 13 of the protuberance 50 from the sidewall 52, defining a finger 55 therebetween. Both of the notches 53 and 54 are triangular in shape, so that the finger 55 is triangular in shape as well. Each of the notches 53 and 54 are sized and shaped to correspond with a finger formed in the oil pan, as will be described later. The notches 53 and 54 and the finger 55 are coextensive to the height C of the sidewall 52, extending completely between the inner face 15 of the front fixture 10 and the face 51 of the protuberance 50.

Figure 3B:
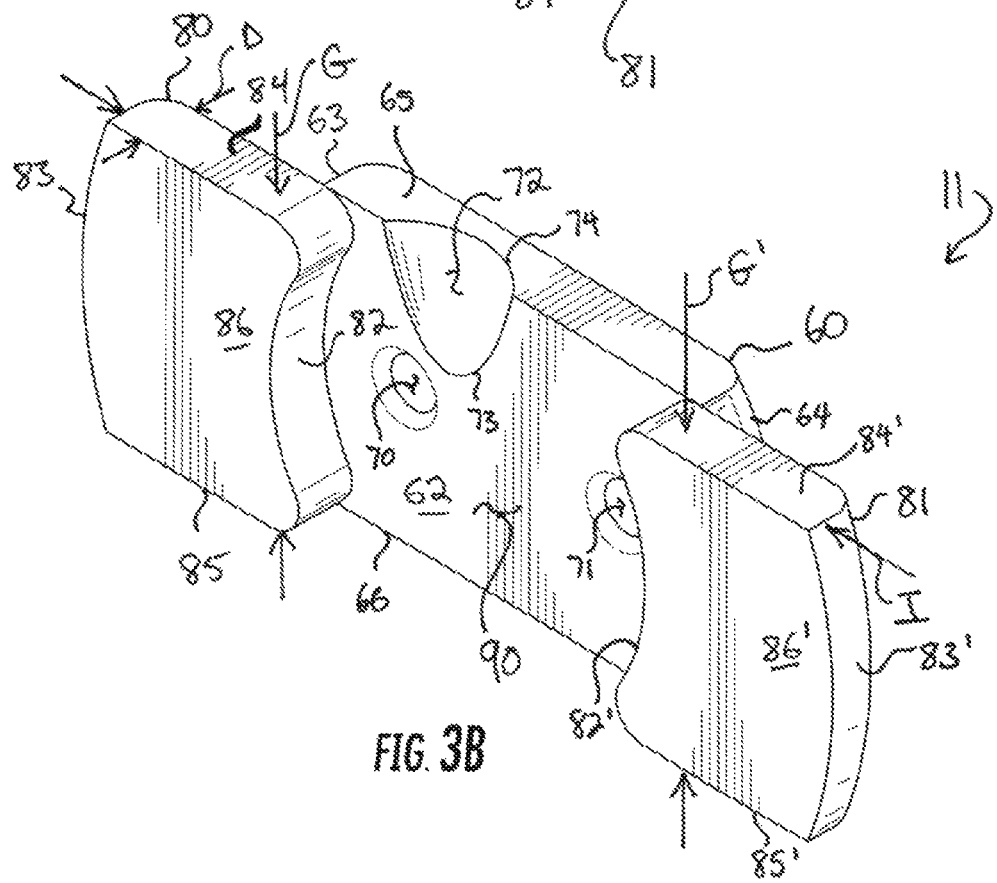

As shown in FIGS. 4A-4E, the front fixture 10 is coupled to the backing plate 11. The backing plate 11 is a clamping means which clamps the front fixture 10 against the oil pan to seal the dipstick adapter assembly 12 around the hole in the oil pan. The backing plate 11 is shown in more detail in FIGS. 3A-3E. The backing plate 11 is a rigid, strong, hard, and durable plate which couples and holds the dipstick adapter assembly 12 together. Referring primarily to FIGS. 3A and 3B, the backing plate 11 has a body 60 having an outer face 61 and an opposed inner face 62, opposed first and second ends 63 and 64, and opposed sides 65 and 66 extending between the first and second ends 63 and 64. The outer and inner faces 61 and 62 are flat and parallel with respect to each other, and the sides 65 and 66 are also flat and parallel with respect to each other. The first and second ends 63 and 64 are arcuate, each bowing outwardly away from the body 60. The curvature of each of the first and second ends 63 and 64 closely corresponds to that of the protuberance 50 of the front fixture 10.

Two holes 70 and 71 are formed through the body 60 between the outer surface 61 and the inner surface 62. The holes 70 and 71 extend transversely through the body 60 perpendicular to the outer and inner surfaces 61 and 62, are located in a generally intermediate location in the body 60 between the sides 65 and 66, and are spaced apart from each other proximate to the first and second ends 63 and 64, respectively. The holes 70 and 71 correspond to the holes 40 and 41; the holes 70 and 71 have the same diameter as the holes 70 and 71, and are spaced apart from each other by a distance equal to the separation of the holes 40 and 41. Indeed, the holes 70 and 71 are sized, shaped, and disposed in the backing plate 11 to correspond to the holes 40 and 41 so that one fastener can be applied through the holes 40 and 41 and another fastener can be applied through the holes 70 and 71 to couple the front fixture 10 to the backing plate 11. Unlike the holes 40 and 41, the holes 70 and 71 are preferably threaded. Additionally, a notch, or cutout 72 is formed into the body 60 between the inner face 62 and the side 65. The cutout 72 corresponds to the dipstick bore 32 as an extension thereof through the backing plate 11 and accommodates a dipstick applied to the dipstick adapter assembly 12 when clamped on an oil pan. The cutout 72 intersects the inner face 62 and forms a first parabolic edge 73 with the inner face 62 extending away from the side 65. The cutout 72 intersects the side 65 and forms a second parabolic edge 74 with the side 65 extending away from the inner face 62. Thus, the cutout 72 is parabolic, or scooped, in its shape extending into the body 60. The cutout 72 is disposed between the holes 70 and 71 just proximate to the hole 70, the first parabolic edge 73 reaches just short of the hole 70 along the inner face 62 between the sides 65 and 66, and the second parabolic edge 74 reaches a generally intermediate position along the side 65 between the outer and inner faces 61 and 62.

Figure 3C:
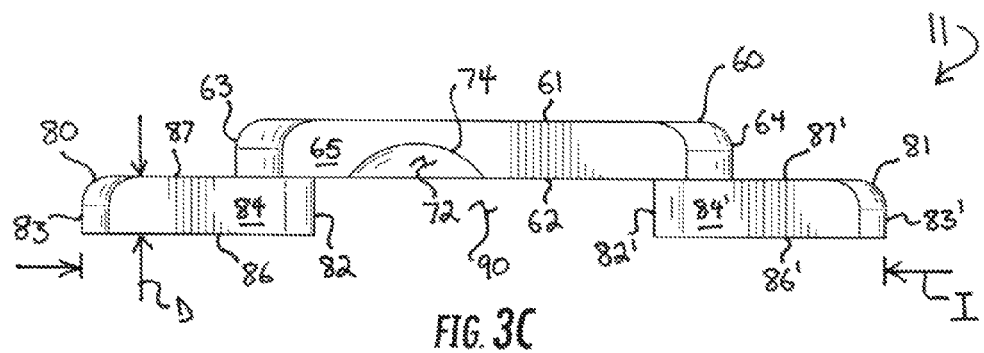
Figure 3D:
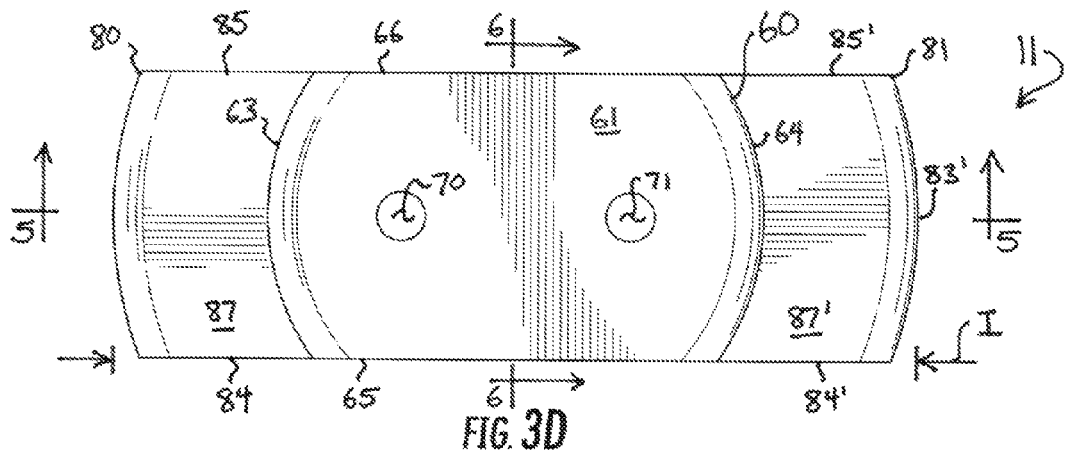

As seen best in FIGS. 3B and 3C, integrally formed to the inner side 62 of the body 60 of the backing plate 11 are two wings 80 and 81 extending outwardly away from the body 60 at the first and second edges 63 and 64, respectively. The wings 80 and 81 are identical and oppositely arranged on the backing plate 11. As such, the following discussion will be limited to the wing 80, with the understanding that the description applies equally to the wing 81. The various structural elements and features of the wing 80 will be marked with a prime ("'") symbol when used to designate identical structural elements and features of the wing 81 so as to distinguish them from those of the wing 80. Continuing the ongoing reference to FIGS. 3A-3E, the wing 80 has an inner end 82, an opposed outer end 83, and sides 84 and 85 which are straight, are parallel, and extend between the inner and outer ends 82 and 83. The wing 80 has an inner face 86 and an opposed outer face 87. The outer face 87 of the wing 81 is parallel to and aligned in the same plane as the inner face 62 of the body 60 of the backing plate 11. Both the inner and outer ends 82 and 83 of the wing 80 are arcuate, with the inner end 82 having a concave bend and the outer end 83 having a convex bend. The curvature of the inner end 82 closely corresponds to that of the protuberance 50 of the front fixture 10. The wing 81 has a thickness D between the inner and outer faces 86 and 87, which spaces the inner face 62 of the body 60 apart from the inner face 86 of the wing 80 by the thickness D, so that the body 60 is above the wing 80. The wing 80 also has a width G between the sides 84 and 85. As stated above, the wing 81 is identical to the wing 80, and as such, the wing 81 has an inner end 82', an opposed outer end 83', sides 84' and 85', an inner face 86' and an opposed outer face 87', a thickness D', and a width G'. While the wing 80 is disposed proximate to the first end 63 of the body 60, the wing 81 is disposed proximate to the second end 64 of the body 60.

Figure 3E:
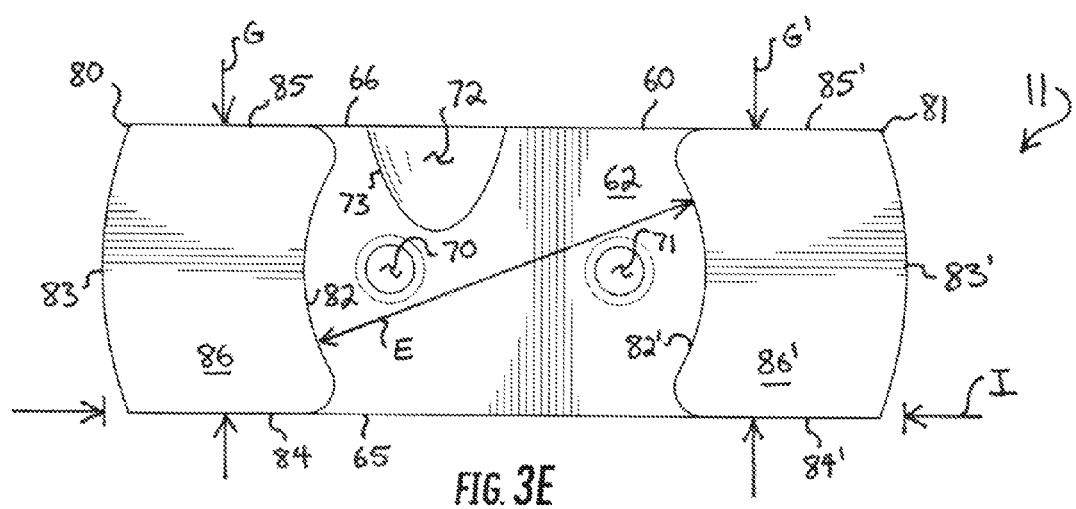

The inner ends 82 and 82' cooperate to define a hold 90. As shown in FIGS. 3B and 3E, the hold 90 is generally cylindrical, extending from the inner surface 62 of the body 60 to the inner surfaces 86 and 86' of the wings 80 and 81, respectively, and bound at two ends between the arcuate inner ends 82 and 82'. The arcuate inner ends 82 and 82' provide the hold 90 with its cylindrical shape, such that the hold 90 has a diameter E shown in FIG. 3E. The inner ends 82 and 82' of the wings 80 and 81 are spaced apart from each other by the diameter E, and the outer end of the wings 80 and 81 are spaced apart by a length I of the backing plate 11. The diameter E is larger than the diameter B of the protuberance 50. The hold 90 is sized and shaped to receive the protuberance 50 when the dipstick adapter assembly 12 is clamped together in operation.

Figure 4C:
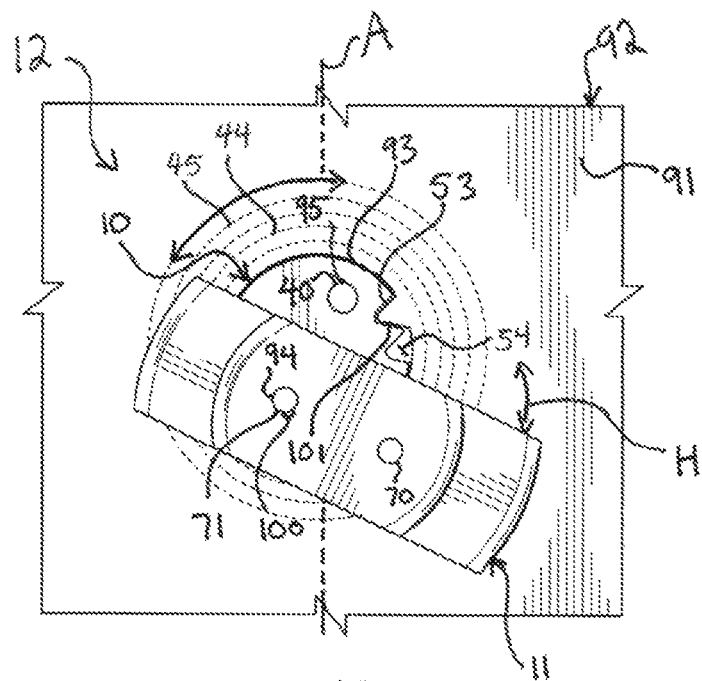
Figure 4D:
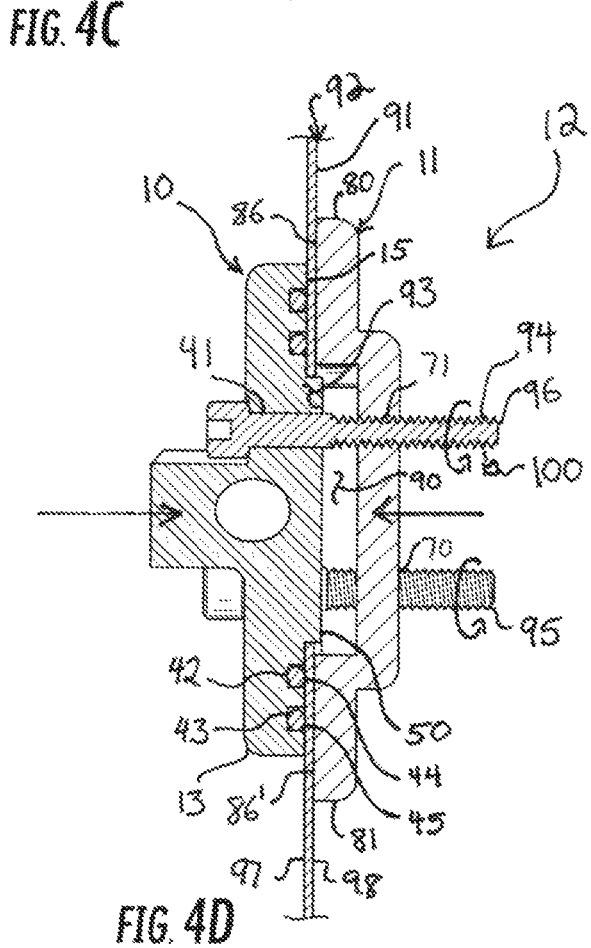

As stated above, the dipstick adapter assembly 12 is useful for replacing a worn or damaged dipstick holder in the oil pan of a vehicle because the dipstick adapter assembly 12 does not require the removal of the oil pan from the vehicle to install. Instead, application of the dipstick adapter assembly 12 is performed and controlled from outside of the oil pan while the oil pan remains installed in the engine compartment of the vehicle. Operation and application of the dipstick adapter assembly 12 will now be discussed with reference to FIGS. 4A-4E, which illustrate a sequences of steps of applying, clamping, and sealing the dipstick adapter assembly to an oil pan. FIGS. 4A, 4B, and 4D are each section views taken along the line 4-4 of FIG. 1B (for the front fixture 10) and line 5-5 of FIG. 3D (of the backing plate 11). Turning first to FIG. 4A, a section of a wall 91 of an oil pan 92 is shown. The wall 91 has a hole 93 in which a worn or damaged dipstick adapter was previously installed and from which the worn or damaged dipstick adapter has been removed. The hole 93 is typically a circular hole with a diameter F, as shown in FIG. 4A. Initially, the dipstick adapter assembly 12 is in a free condition, in which the dipstick adapter assembly 12 is outside of the oil pan 92. FIG. 4A shows the dipstick adapter assembly 12 being moved out of the free condition, by passing the backing plate 11 through the hole 93 to inside of the oil pan. The wall 91 has an outer surface and an opposed inner surface, and it is noted that, as the wall 91 of the oil pan 92 is drawn, the space to the right of the wall 91 is inside of the oil pan 92, and the space to the left of the wall 91 is outside of the oil pan 92; hence, the dipstick adapter assembly 12 is shown as being arranged and applied from left to right, or from outside of the oil pan 92 to inside of the oil pan 92.

Two bolts 94 and 95 are applied to the front fixture 10. Each of the bolts 94 and 95 is conventional and has a threaded shank portion, an unthreaded shank portion, and a head formed with a socket for interfacing with a tool such as a screwdriver or allen wrench. Although the bolts 94 and 95 are shown in FIGS. 4A-4E, one having ordinary skill in the art will readily appreciate that another suitable fastener may be used instead. Initially, the bolt 94 is applied to and extends from the front fixture 10 through the hole 41 and into the hole 71 in the backing plate 11, coupling the backing plate 11 to the front fixture 10. The threaded shank portion of the bolt 94 is threaded into the hole 71 in the backing plate 11, and a majority of the unthreaded shank portion of the bolt 94 is received in the hole 41 of the front fixture 10. The dipstick adapter assembly 12 is preferably sold and provided to the customer or user in this configuration, with the bolt 94 already applied to the front fixture 10 and the backing plate 11. Further, an end 96 of the bolt 94 has a small weld 100 to the outer face 61 of the backing plate 11, so that the backing plate 11 is fixed on the bolt 94 and cannot be rotated with respect to the bolt 94. The weld 100 is a bond between the bolt 94 and the backing plate 11 and allows the user to position and align the front fixture 10 and the backing plate 11 with respect to each other and to the hole 93 in the oil pan 92, when the backing plate 11 is within the oil pan 92 and inaccessible by hand.

To move the dipstick adapter assembly 12 from the free condition to that shown in FIG. 4A, the dipstick adapter assembly 12 is taken up, such as by hand from outside of the oil pan 92, and the wing 80 is carefully introduced through the hole 93. The width G (shown in FIG. 3E) of the wing 80 is less than the diameter F of the hole 93 so that the wing 80 may pass easily through the hole 93 until the body 60 of the backing plate 11 and the end 96 of the bolt 94 are disposed in the hole 93. The length I (shown in FIGS. 3A-3E) is greater than the diameter F of the hole 93. The wing 80 is inside of the oil pan 92, the wing 81 is outside of the oil pan 92, and the front fixture 92 is outside of the oil pan 92.

To next move the dipstick adapter assembly 12 into the arrangement shown in FIG. 4B, which illustrates a ready condition of the dipstick adapter assembly 12 in which the front fixture 10 is outside of the oil pan 92 and the backing plate 11 is entirely inside of the oil pan 92, the dipstick adapter assembly 12 is moved downward along the arcuate arrowed line H shown in FIG. 4A. This movement is accomplished by lowering the front fixture 10 and the bolt 94 extending from the front fixture 10 to the backing plate 11 along the line H from outside of the oil pan 92. Movement along line H moves the backing plate 12 down to the bottom of the hole 93 with the bolt 94 near to the edge of the hole 93 and allows the wing 81 to clear the hole 93. The wing 81 is passed through the hole 93 inside of the oil pan 92, and the dipstick adapter assembly 12 is thereafter moved up, so that the body 60 of the backing plate 11 is registered with the hole 93, the bolt 94 extends transversely through the hole 93 inside of the oil pan 92, and the front fixture 10 is registered with the hole 93 outside of the oil pan 92.

While the front fixture 10 and the backing plate 11 are held fixed in position by holding the bolt 94—to which the front fixture 10 and the backing plate 11 are fixed—the bolt 95 is advanced toward the backing plate 11 by turning the bolt 95 in a clockwise direction from outside of the oil pan 92. Rotation of the bolt 95 is stopped just behind the inner face 62 of the body 60 of the backing plate 11, so that the bolt 95 is not yet engaged with the backing plate 11. Before engaging the bolt 95 with the backing plate 11, the protuberance 50 is aligned and registered with the hole 93. While applying forward pressure on the front fixture 10 into the oil pan 92, the user rotates the front fixture 10 against the hole 93 from outside of the oil pan 92. By rotating the front fixture 10, the user can register one of the notches 53 and 54 with a finger 101 in the hole 93. The finger 101 is a triangular extension of the wall 91 into the hole 93 and is common to many oil pans. In different vehicles, the finger 101 is positioned slightly differently, but one of the notches 53 and 54 fits the finger 101, so that the axis A of the body 13 of the front fixture 10 is vertical, which ensures that the dipstick to be applied to the dipstick adapter assembly 12 will remain vertical. The user thus rotates the front fixture 10, while applying forward pressure on the front fixture 10 into the wall 91, until the finger 101 fits and slides into the one of the notches 53 and 54 and the axis A is vertical. In this way, the finger 101 and the one of the notches 53 and 54 define a key and keyway set, in which the key (the finger 101) is received in one of the keyways (the one of the notches 53 and 54) for proper alignment of the dipstick adapter assembly 12.

When the finger 101 is registered with the one of the notches 53 and 54, the front fixture 10 is pushed into the hole 93 of the oil pan 94. The protuberance 50 of the front fixture 10 is applied through the hole 93, and because the diameter B of the protuberance 50 is just less than the the diameter F of the hole 93, the protuberance 50 is closely received by the hole 93. The protuberance 50 is applied through the hole 93 until the gaskets 44 and 45 contact the wall 91 of the oil pan 92 just outside of the diameter F of the hole 93. With the protuberance 50 in the hole 93, the gaskets 44 and 45 against the wall 91, and the finger 101 received in the notch 53 (as shown in FIG. 4C), the front fixture 10 is held steady and prevented from relative rotational or axial motion with respect to the oil pan 92. The backing plate 11 can now be aligned with the front fixture 10.

As shown in in FIG. 4C, the bolt 95 is already applied through both the front fixture 10 and the backing plate 11, but the hole 40 in the front fixture 10 must be aligned with the hole 70 in the backing plate 11 so that the bolt 95 may be passed into the hole 70 and the front fixture 10 may thereby be aligned and further secured to the backing plate 11. The weld 100 formed between the bolt 94 and backing plate 11 allows the user to rotate the backing plate 11 inside of the oil pan 92 along the double-arrowed arcuate line H from outside of the oil pan 92 by slowly turning the bolt 94 clockwise and counter-clockwise. As described above, the bolt 95 has already been advanced to just short of the inner face 62 of the body 60 of the backing plate 60 but has not been applied through the hole 70. Therefore, by applying a small amount of axial force on the bolt 95 in a direction out of the hole 93 while turning the bolt 95 and the backing plate 11 fixed to the bolt 95, from outside of the oil pan 92 the user will feel the bolt 95 catch or drop into the hole 70. When the bolt 95 drops into the hole 70, the protuberance 50 is registered with the hole 93 through the oil pan 92, and the gaskets 44 and 45 are registered with and encircle the hole 93. The user then turns the bolt 95 in a clockwise direction to advance the bolt 95 through the hole 70 in the backing plate 11, securing the backing plate 11 on both bolts 94 and 95.

To bring the front fixture 10 and the backing plate 11 together as shown in FIG. 4D, both bolts 94 and 95 are threadably advanced through the backing plate 11. Now that the backing plate 11 is secured on both bolts 94 and 95, the backing plate 11 cannot be rotated with respect to just the bolt 94. The user applies a large amount of torque to the bolt 94 in the clockwise direction to turn the bolt 94 with respect to the backing plate 11, which causes the weld 100 to break free from the end 96 of the bolt 94, as shown in FIG. 4D, thereby allowing the bolt 94 to be rotated and threaded freely. From outside of the oil pan 92, each of the bolts 94 and 95 are then turned in a clockwise direction so that the front fixture 10 remains against the wall 91 of the oil pan 92 and the backing plate 11 is advanced toward the wall 91 as well until the protuberance 50 is received within the hold 90 of the backing plate 11, the inner faces 86 and 86' of the wings 80 and 81 of the backing plate 11 are in contact with the wall 91, and the wings 80 and 81 are diametrically opposed from each other on opposed sides of the hole 93.

The bolts 94 and 95 make adjustments to the backing plate 11; turning the bolts 94 and 95 further to tighten the dipstick adapter assembly 12 on the wall 91, causes the front fixture 10 to clamp to the backing plate 11 with the wall 91 therebetween, thereby clamping the front fixture 10 against wall 91 and the backing plate 11 against the wall 91 as well, defining an applied condition of the dipstick adapter assembly 12. The body 13 of the front fixture 10 is larger than the diameter F of the hole 93, thereby preventing the front fixture 10 from being passed through the hole 93 and providing a stable base against which the backing plate 11 is clamped against inner surface 98 the wall 91. The inner ends 82 and 82' of the wings 80 and 81, respectively, are spaced apart by the diameter E of the hold 50, which is wider than the diameter B of the protuberance 50, which is just less than the diameter F of the hole 93; the inner ends 82 and 82' are spaced apart by a distance larger than the diameter F of the hole 93 so that the backing plate 11, once applied against the wall 91, is prevented from being pulled through the hole 93 from inside of the oil pan 92 to outside of the oil pan 92, thereby providing a stable base against which the front fixture 10 is clamped against the outer surface 97 wall 91. The gaskets 44 and 45 are compressed between the wall 91 and the grooves 42 and 43, respectively, forming a seal around the hole 93 between the front fixture 10 and the wall 91 of the oil pan 92.

Figure 4E:
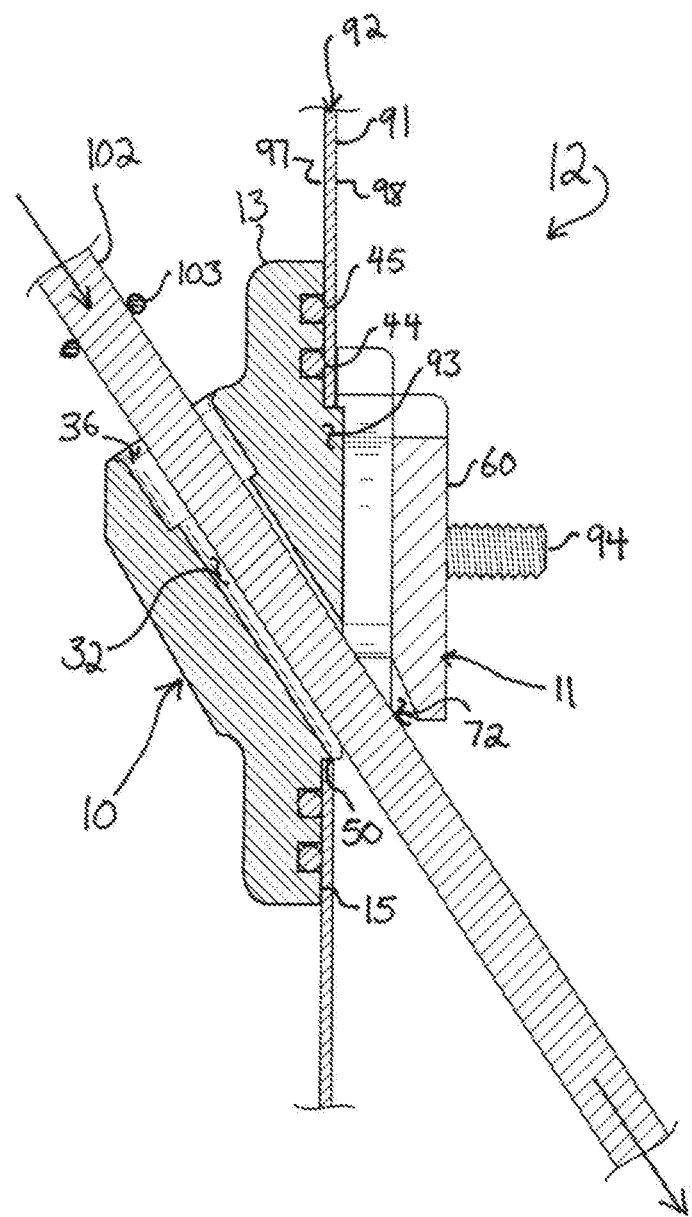

With the front fixture 10 clamped against the wall 91 of the oil pan 92 in the applied condition of the dipstick adapter assembly 12, the hole 93 is sealed by the dipstick adapter device 12 and is ready to receive a dipstick 102, shown in FIG. 4E. FIG. 4E is a section view taken along the line 2-2 in FIG. 1B (for the front fixture 10) and along the line 6-6 in FIG. 3D (for the backing plate 11). The dipstick 102 is applied through the mouth 36 and into the dipstick bore 32 in the front fixture 10 and through the cutout 72 in the backing plate 11, until a gasket 103 fit onto the dipstick 102 is seated into the mouth 36. The dipstick 102 is held generally in an upward direction. In this arrangement, the vehicle is ready for use with a new dipstick adapter assembly 12, the installation of which did not require the oil pan 92 to be removed from the vehicle.

The present invention is described above with reference to a preferred embodiment. However, those skilled in the art will recognize that changes and modifications may be made in the described embodiment without departing from the nature and scope of the present invention. To the extent that such modifications and variations do not depart from the spirit of the invention, they are intended to be included within the scope thereof.

Having fully and clearly described the invention so as to enable one having skill in the art to understand and practice the same, the invention claimed is:

1. An assembly comprising:
   an oil pan having an inner surface, an outer surface, and a hole through the oil pan between the inner and outer surface;
   a front fixture;
   clamping means coupled to the front fixture;
   a first fastener coupling the front fixture to the clamping means, the first fastener fixed to the clamping means with a bond to prevent rotation of the clamping means with respect to the first fastener; and a second fastener applied to the front fixture for application to the clamping means to move the clamping means toward and away from the front fixture;

the clamping means is moveable through the hole to arrange the assembly between a free condition, in which the clamping means is outside the oil pan, and an applied condition, in which the clamping means is inside the oil pan;

wherein in the applied condition of the assembly, the front fixture encircles the hole in direct contact against the outer surface of the oil pan and is sealed around the hole.

2. The assembly of claim 1, further comprising:
a gasket carried by the front fixture; and
in the applied condition of the assembly, the gasket is compressed against the outer surface of the oil pan around the hole.

3. The assembly of claim 1, wherein the front fixture is formed with a keyway capable of receiving a key formed in the oil pan proximate to the hole in the applied condition of the assembly to align the front fixture with respect to the oil pan.

4. The assembly of claim 1, wherein in the applied condition of the assembly, the front fixture is fit through the hole in close receipt by the hole.

5. The assembly of claim 1, wherein:
the front fixture is larger than the hole; and
the clamping means has a length which is larger than the hole, and a width, transverse to the length, which is a smaller than the hole.

6. The assembly of claim 1, wherein in the applied condition of the assembly, the clamping means is disposed on opposed sides of the hole inside the oil pan.

7. An assembly for use with an oil pan, the assembly comprising:
a front fixture having an inner face;
a backing plate coupled to the front fixture opposite the inner face;
a first fastener applied through the front fixture and fixed to the backing plate with a bond to prevent rotation of the backing plate with respect to the first fastener; and
a second fastener applied to the front fixture for application to the backing plate so as to engage the backing plate and move the backing plate toward and away from the front fixture;
wherein the backing plate is capable of fitting through a hole formed in the oil pan, said hole being smaller than the front fixture.

8. The assembly of claim 7, further comprising a gasket carried by the inner face of the front fixture.

9. The assembly of claim 7, wherein the front fixture is formed with a keyway capable of receiving a key formed in the oil pan.

10. The assembly of claim 7, wherein the bond between the first fastener and the backing plate is breakable.

11. The assembly of claim 7, further comprising:
a dipstick bore formed through the front fixture; and
the dipstick bore is mis-aligned with the backing plate, so that a dipstick applied to the dipstick bore avoids the backing plate.

12. The assembly of claim 7, further comprising:
a hold formed into an inner face of the backing plate;
a protuberance formed on the inner face of the front fixture opposite the inner face of the backing plate; and
the hold is sized and shaped to receive the protuberance therein.

13. A method of replacing a dipstick adapter in a hole in a vehicle oil pan, the method comprising the steps of:
providing a clamp assembly;
applying the clamp assembly to the hole;
sealing the hole with the clamp assembly; and
applying a dipstick to the clamp assembly to extend from outside of the oil pan to inside of the oil pan;
wherein each step is performed without removing the oil pan from the vehicle.

14. The method of claim 13, wherein the clamp assembly includes a front fixture and a clamping means coupled to the front fixture.

15. The method of claim 14, wherein the step of applying the clamp assembly to the hole includes passing the clamping means through the hole to inside of the oil pan while the clamping means remains coupled to the front fixture.

16. The method of claim 14, wherein:
the clamp assembly further includes a gasket;
the step of sealing the hole with the clamp assembly includes registering the gasket around the hole; and
the method further includes the step of clamping the front fixture to the oil pan with the clamping means.

17. The method of claim 14, wherein:
the clamp assembly includes a first fastener coupling the clamping means to the front fixture, and the first fastener is fixed to the clamping means with a bond to prevent rotation of the clamping means with respect to the first fastener; and
the step of sealing the hole with the clamp assembly further includes:
registering the front fixture with the hole;
registering the clamping means with the front fixture;
holding the clamping means stationary with respect to the front fixture and the hole with the first fastener; and
applying a second fastener through the front fixture and the clamping means to clamp the front fixture and the clamping means toward each other.

18. The method of claim 17, wherein the step of sealing the hole with the assembly further includes:
breaking the bond between the first fastener and the clamping means to allow movement of the first fastener; and
fastening the first fastener between the front fixture and the clamping means.

19. The method of claim 13, wherein the step of applying the clamp assembly to the hole includes registering a keyway formed in the clamp assembly with a key formed in the oil pan proximate to the hole.

* * * * *